US006821590B2

(12) United States Patent
Verrall et al.

(10) Patent No.: US 6,821,590 B2
(45) Date of Patent: Nov. 23, 2004

(54) STARCH-LOADED POLYVINYL ALCOHOL COPOLYMER FILM

(75) Inventors: Andrew P. Verrall, Crown Point, IN (US); P. Scott Bening, Crown Point, IN (US); Karen A. Kugler, Porter, IN (US)

(73) Assignee: MonoSol, LLC, Portage, IN (US)

(*) Notice: Subject to any disclaimer, the term of this patent is extended or adjusted under 35 U.S.C. 154(b) by 0 days.

(21) Appl. No.: 10/367,050

(22) Filed: Feb. 14, 2003

(65) Prior Publication Data

US 2004/0161557 A1 Aug. 19, 2004

(51) Int. Cl.⁷ .............................. C08J 3/03; C08J 3/205
(52) U.S. Cl. ........................ 428/35.7; 524/47; 524/53
(58) Field of Search .................... 428/35.7; 524/47, 524/53

(56) References Cited

U.S. PATENT DOCUMENTS

| | | |
|---|---|---|
| 3,949,145 A | 4/1976 | Otey et al. |
| 4,521,561 A | 6/1985 | Hausman et al. |
| 4,747,976 A | 5/1988 | Yang et al. |
| 5,106,890 A | 4/1992 | Maruhashi et al. |
| 5,108,807 A * | 4/1992 | Tucker ...................... 428/35.2 |
| 5,258,430 A | 11/1993 | Bastioli et al. |
| 5,661,217 A | 8/1997 | Honeycutt et al. |
| 5,914,368 A | 6/1999 | Haschke et al. |

FOREIGN PATENT DOCUMENTS

WO   WO 2003/028977 A1 * 4/2003

OTHER PUBLICATIONS

Copies of advertisements showing a water–soluble film packet for containing dry bleaches, soaps, detergents, dyes, and other soluble products, Mono–Sol Corporation and Baldwin Rubber Company, 1962.
Product information regarding Elvano™ obtained from DuPont website (http://www.dupont.com/industrial–polymers/elvanol), Dec. 27, 2002.

* cited by examiner

Primary Examiner—Sandra M. Nolan
(74) Attorney, Agent, or Firm—Marshall, Gerstein & Borun LLP

(57) ABSTRACT

A water-soluble film for packaging a non-liquid product is disclosed. The film is made from a hydrolyzed copolymer of vinyl acetate and methyl acrylate in the range of from about 30 to about 95 percent by weight, modified starch in the range of from about 8 to about 30 percent by weight, plasticizer in the range of from about 5 to about 30 percent by weight, lubricant/release agent in the range of from about 0.0 to about 1.5 percent by weight, and surfactant in the range of from about 0.01 to about 1.5 percent by weight. The increased starch content of the resultant film lowers production cost, but creates physical incompatibilities for use with liquid products.

65 Claims, 2 Drawing Sheets

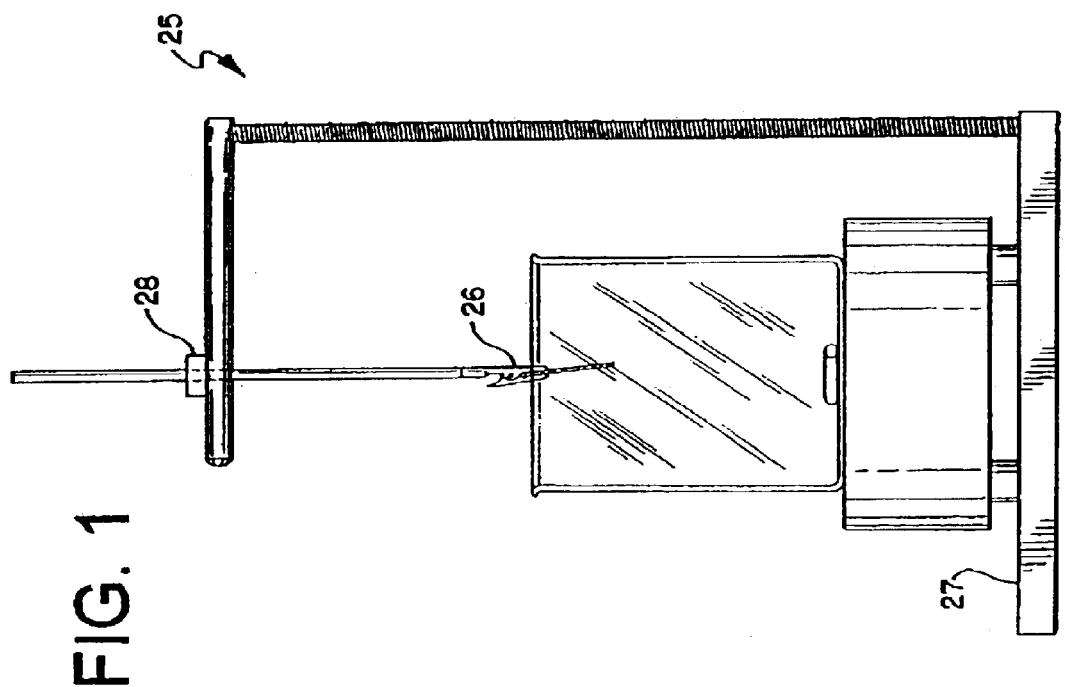
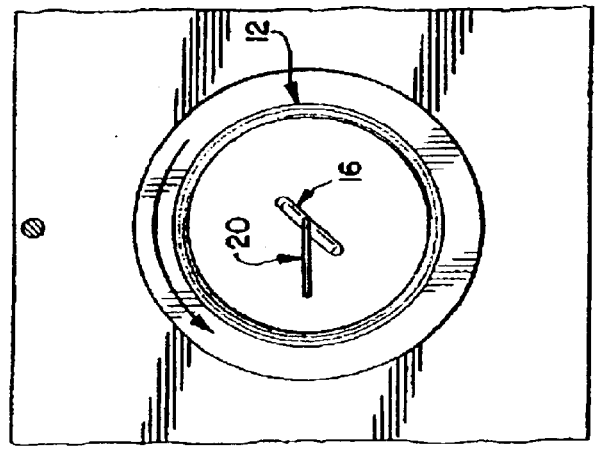

STARCH-LOADED POLYVINYL ALCOHOL COPOLYMER FILM

TECHNICAL FIELD OF INVENTION

The present invention relates generally to water-soluble polyvinyl alcohol (PVOH) film. More specifically, the present invention relates to water-soluble PVOH film with particular applications for packaging of non-liquid products, such as cleansers, conditioners, disinfectants, or the like.

BACKGROUND OF THE INVENTION

Polyvinyl alcohol (PVOH) is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). Both fully and partially hydrolyzed PVOH types are commonly referred to as PVOH homopolymers although the partially hydrolyzed type is technically a vinyl alcohol-vinyl acetate copolymer.

The term PVOH copolymer is generally used to describe polymers that are derived by the hydrolysis of a copolymer of a vinyl ester, typically vinyl acetate, and another monomer. PVOH copolymers can be tailored to desired film characteristics by varying the kind and quantity of copolymerized monomers. Examples of copolymerizations are those of vinyl acetate with a carboxylic acid or with an ester of a carboxylic acid. Again, if the hydrolysis of acetate groups in these copolymers is only partial, then the resulting polymer could be described as a PVOH terpolymer—having vinyl acetate, vinyl alcohol, and carboxylic acid groups—although it is commonly referred to as a copolymer.

It is known in the art that many PVOH copolymers, because of their structure, can be much more rapidly soluble in cold water than the partially hydrolyzed type of PVOH homopolymers. Such copolymers have therefore found considerable utility in the fabrication of packaging films for the unit dose presentation of various liquid and powdered products including agrochemicals, household and industrial cleaning chemicals, laundry detergents, water treatment chemicals and the like.

The manufacture of packaging films for liquid products poses a unique concern, as they must be free of bubbles and pin holes, and capable of resisting problems such as physical incompatibility exemplified by "weeping"—a condition whereby the package contents seep from the film over a prolonged storage period—caused by certain components typically used in liquid detergent products. The increased level of quality required to manufacture a film and package such liquids adds significantly to the packaged product cost.

Conversely, powdered products are far more forgiving when it comes to packaging. Pin holes and micro bubbles in the film do not present problems for packaging powdered products. Physical compatibility is less problematic, due in part to the non-existence of migrating materials in powdered detergents. Finally, weeping and early film decomposition do not commonly occur with the packaging of powdered products. For these reasons the type and quality of PVOH film used to package powered products can be significantly varied from that for the liquid counterparts.

However, those in the powdered product industry have been directed toward the use of either the higher quality, more expensive PVOH copolymer films designed for liquid product packaging or inferior films such as less diverse and more slowly soluble homopolymer-based films including films produced by blown extrusion.

The present invention has solved this problem of film quality versus manufacturing cost as it relates to packaging of powdered product, as well as other problems faced by those in the industry. By making a less expensive PVOH copolymer film having good water-soluble qualities, those in the industry have an alternative source for packaging powdered products.

SUMMARY OF THE INVENTION

A water-soluble film suitable for packaging a non-liquid product, including the method for preparing the film composition and packaging for the non-liquid product, is disclosed. In one particular embodiment of the invention, the film composition comprises a hydrolyzed copolymer of vinyl acetate and methyl acrylate in the range of from about 30 to about 95 percent by weight, modified starch in the range of from about 8 to about 30 percent by weight, plasticizer in the range of from about 5 to about 30 percent by weight, lubricant/release agent in the range of from about 0.0 to about 1.5 percent by weight, and surfactant in the range of from about 0.01 to about 1.5 percent by weight.

In a preferred embodiment of the invention, the film composition utilizes an agent to prevent color drift, particularly browning, of a polymer solution used to cast the film. Preferably the agent comprises sodium metabisulfite in an amount in the range of from about 0.12 to about 1.0 percent by weight. Most preferably, the sodium metabisulfite is used in an amount in the range of from about 0.4 to about 0.7 percent by weight.

A preferred method for preparing a water-soluble copolymer film for packaging of a non-liquid product is also disclosed and claimed. The method comprises the steps of copolymerizing vinyl acetate and methyl acrylate to form a copolymer, hydrolyzing the vinyl acetate-methyl acrylate copolymer to form a vinyl alcohol-gamma lactone copolymer having a 4% solution viscosity in the range of from about 5 to about 50 cps at 20° C., slurrying the hydrolyzed polymer with water, adding modified starch to the copolymer-water slurry in an amount of from about 8.0 to about 25.0 percent by weight, heating the hydrolyzed copolymer and starch slurry to form a solution, treating the solution with caustic soda to create a solution of a copolymer having from about 1 to about 12 mol percent carboxylate groups, from about 0 to about 11 mol percent gamma lactone units, and from about 88 to about 99 mol percent vinyl alcohol units, and then casting the hot copolymer solution on a suitable surface to create a film having a thickness in the range of from about 0.1 to about 5.0 mils (about 0.0025 to about 0.127 mm).

A package for containing a non-liquid product is also disclosed and claimed. A preferred package comprises at least one compartment comprised of a water-soluble film comprising from about 30 to about 95 percent by weight of a hydrolyzed copolymer of vinyl acetate and methyl acrylate, from about 8 to about 30 percent by weight of modified starch filler, from about 5 to about 30 percent by weight of plasticizer, and from about 0.01 to about 1.5 percent by weight of a surfactant.

In one embodiment the package may be used to deliver a unit dose of a non-liquid agent. The preferred unit dose comprises a package comprising a water-soluble film comprising from about 40 to about 90 percent by weight of a hydrolyzed copolymer of vinyl acetate and methyl acrylate, from about 8 to about 30 percent by weight of a modified starch filler, from about 5 to about 30 percent by weight of a plasticizer, and from about 0.01 to about 1.0 percent by weight of a surfactant, and a non-liquid agent contained within the package. The non-liquid agent may be a-cleanser, a disinfectant, a polish, a conditioner, or the like.

These and other objects of the invention are disclosed and claimed in the following detailed description of the invention, including the appended drawings.

BRIEF DESCRIPTION OF THE DRAWINGS

The present invention described herein can be more readily understood with reference to the appended drawing figures where:

FIG. 1 is a perspective view of a test apparatus used to analyze the water disintegration and dissolution of film samples;

FIG. 3 is a top view of the test set-up of FIG. 2.

DETAILED DESCRIPTION OF PREFERRED EMBODIMENTS

Figure 2:
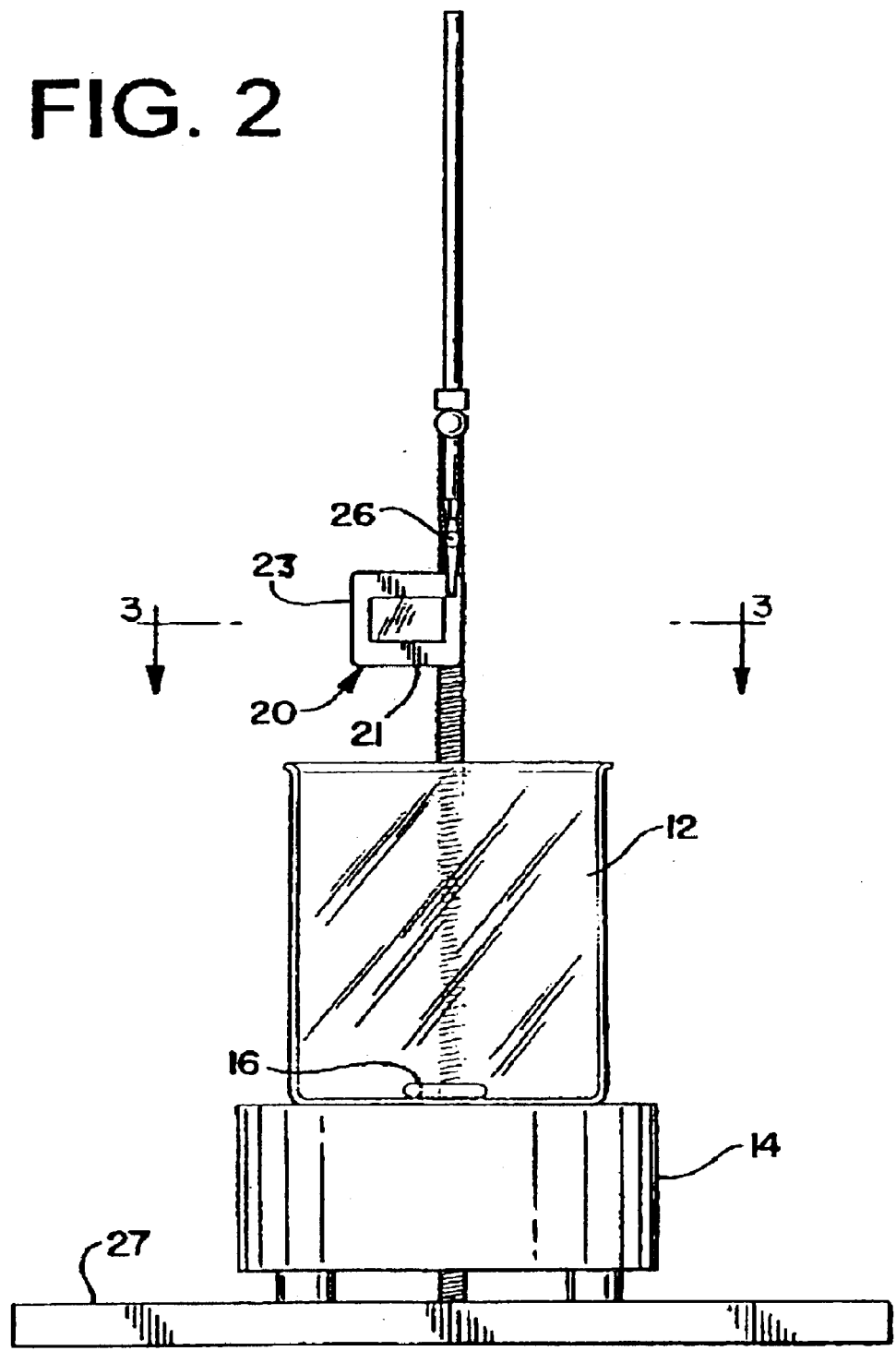
FIG. 2 is a perspective view of the test apparatus and test set-up illustrating the procedure for analyzing the water-solubility of film samples.

While the invention is susceptible of embodiment in many different forms, this disclosure will describe in detail preferred embodiments of the invention with the understanding that the present disclosure is to be considered as an exemplification of the principles of the invention and is not intended to limit the broad aspect of the invention to the embodiments illustrated.

Film Composition:

The present invention is a water-soluble film for packaging a non-liquid product. The following is a list of terms used throughout the present application:

"Non-liquid" shall refer to any product that has as a component a form characteristic of a solid, including but not limited to powder, caked, shaving, solid, gel, slurry, paste, pelletize, and the like.

"Package" or "packaging" shall refer to any receptacle or method suitable for holding or enclosing, to a substantial degree, a quantity of non-liquid product, without regard to size, shape, or the number of parts used to form the container or carry out the method.

Further, all ranges set forth herein include all possible subsets of ranges and any combinations of such subset ranges. Ranges are inclusive of the stated endpoints as well.

The film of the present invention is based on an amount of a hydrolyzed copolymer of vinyl acetate and methyl acrylate and is a vinyl alcohol-gamma lactone copolymer, in the range of from about 30 to about 95 percent by weight. Preferably, the amount of copolymer is in the range of from about 50 to about 85 percent by weight. The copolymer may be prepared in any manner known by those skilled in the art. A particularly suitable copolymer is sold by E.I. duPont de Nemours under the tradename ELVANOL®. The ELVANOL® range of water-soluble synthetic polymers have excellent film-forming, emulsifying, and adhesive properties. They offer resistance to oil, grease and solvents, plus high tensile strength, flexibility, and high oxygen barrier.

Alternatively, and less preferably, a vinyl acetate-methyl acrylate copolymer must first undergo hydrolysis (also called alcoholysis) to form a vinyl alcohol-gamma lactone copolymer. The vinyl alcohol-gamma lactone copolymer preferably has a 4% solution viscosity in the range of from about 5 to about 50 cps (0.005 to 0.050 pascal seconds) at 20° C. (68° F.). More preferably the vinyl alcohol-gamma lactone copolymer has a 4% solution viscosity in the range of from about 8 to about 35 cps (0.008 to 0.035 pascal seconds) and, most preferably, the vinyl alcohol-gamma lactone copolymer has a 4% solution viscosity in the range of from about 15 to about 25 cps (0.015 to 0.025 pascal seconds).

The hydrolyzed copolymer initially comprises an amount of gamma lactone units preferably from about 2 to about 8 mol percent, more preferably from about 4 to about 6 mol percent. Modified starch is added to the hydrolyzed copolymer, which is first slurried with water, in an amount in the range of from about 8 to about 30 percent by weight. While other modified starches may be suitable, the preferred modified starch is hydroxyethyl modified starch in an amount of about 10 percent by weight.

The composition also comprises plasticizer in the range of from about 5 to about 30 percent by weight, most preferably in the range of from about 25 to about 30 percent by weight, lubricant/release agent in the range of from about 0.0 to about 1.5 percent by weight, and surfactant in the range of from about 0.01 to about 1.5 percent by weight. Other suitable components, such as additional plasticizers, lubricants, and release agents, fillers, extenders, antiblocking agents, detackifying agents, antifoams and other functional ingredients, may be added in proper amounts to achieve a desired effect to the extent such components do not inhibit other required characteristics of the copolymer film.

The copolymer solution must be treated with caustic soda (sodium hydroxide), to yield a copolymer solution having from about 1 to about 12 mol percent, preferably from about 2 to about 6 mol percent, and most preferably from about 3 to about 4 mol percent carboxylate groups, from 0 to about 11 mol percent, preferably from 0 to about 5 mol percent, and most preferably from about 1 to about 2 mol percent gamma lactone units, and from about 88 to 99 mol percent, preferably from about 92 to about 98 mol percent, and most preferably from about 94 to about 96 mol percent vinyl alcohol units.

The copolymer solution is then cast to create a film having a thickness in the range of from about 0.5 mils to about 5.0 mils (about 0.013 to about 0.127 mm). The film thickness will have a direct effect on the speed at which the final product will dissolve in water, with thin films (i.e., less than 3.0 mil or 0.076 mm) completely dissolving in less time. Conversely, thinner films provide less structural protection than their thicker film counterparts. A balance must be struck between these and other factors. For many applications, a preferable film thickness is in the range of from about 0.5 to about 3.0 mils (about 0.013 to about 0.076 mm), and most preferably in the range of from about 1.0 to about 2.0 mils (about 0.025 to about 0.050 mm).

It has been discovered that during preparation of the copolymer solution a browning effect occurs. It is desirable in most applications that the water-soluble film have a clear and colorless appearance. To combat this, and any other known color drift to which the copolymer solution may be susceptible, a suitable agent must be added to the copolymer solution. The use of sodium metabisulfite has been found to maintain the solution clarity and colorlessness during preparation when used in an amount in the range of from about 0.12 to about 1.0 percent by weight, most preferably in an amount from about 0.4 to about 0.7 percent by weight.

Suitable plasticizers include, but are not limited to, glycerin, diglycerin, sorbitol, ethylene glycol, diethylene glycol, triethylene glycol, tetraethylene glycol, propylene glycol, polyethylene glycols up to 400 MW, neopentyl glycol, trimethylolpropane, polyether polyols and ethanolamines. Preferred plasticizers are glycerin, triethyleneglycol, propylene glycol and trimethylolpropane.

Suitable surfactants may include the nonionic, cationic, anionic and zwitterionic classes. Preferably, the surfactants will be of the nonionic, cationic or zwitterionic classes or combinations of these. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Preferred surfactants are alcohol ethoxylates, quaternary ammonium salts and amine oxides.

Suitable lubricants/release agents include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates.

Suitable fillers/extenders/antiblocking agents/ detackifying agents include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. If used, the preferred amount of such filler/extender/antiblocking agent/detackifying agent in the water-soluble film of the present invention is between 0.1% and 25% by weight, more preferably between 1%–15% by weight, and between 1% and 5% by weight if starch is absent.

Suitable antifoams include, but are not limited to, those based on polydimethylsiloxanes and hydrocarbon blends. If used, the preferred amount of antifoam in the water-soluble film of the present invention is between 0.001% and 0.5%, more preferably between 0.01% and 0.1% by weight.

Film Formation:

The preferred method for preparing the water-soluble copolymer film of the present invention comprises the steps of copolymerizing vinyl acetate and methyl acrylate to form a copolymer. Alternatively, this vinyl acetate-methyl acrylate copolymer may be more readily purchased. In either case, the next step is hydrolyzing the vinyl acetate-methyl acrylate copolymer to form a vinyl alcohol-gamma lactone copolymer having a 4% solution viscosity in the range of from about 5 to about 50 cps at 20° C. Then slurrying the hydrolyzed polymer with water is required while adding modified starch to the copolymer-water slurry in an amount of from about 8.0 to about 25.0 percent by weight. Most preferably the amount of modified starch is about 10 percent by weight. The hydrolyzed copolymer and starch slurry is then heated to boiling point to form a solution.

The solution is then treated with caustic soda to create a solution of a copolymer having from about 1 to about 12 mol percent carboxylate groups, from about 0 to about 11 mol percent gamma lactone units, and from about 88 to about 99 mol percent vinyl alcohol units. More preferable ranges have been previously stated. The next step is maintaining the solution at a temperature in the range of from about 160° F. to about 200° F., and then casting the hot copolymer solution on a suitable surface to create a film having a thickness in the range of from about 0.1 to about 5.0 mils (about 0.0025 to about 0.127 mm).

It has been found that the treated solution undergoes a browning while being held at the high temperature. This is undesirable for most applications, as a clear film is sought. Therefore, the method further comprises the step of adding sodium metabisulfite in an amount greater than 0.12 percent by weight to prevent browning of the heated solution. Most preferably, the bisulfite is added in the amount of from about 0.4 to about 0.7 percent by weight.

The resulting film can then be formed into a package for containing a non-liquid product, as previously described. Formation of such a suitable package is known by those skilled in the art. A requirement of the film, and therefore the formed package, is that it be capable of complete dissolution in water in a relatively short period of time. The film of the present invention, at a thickness of about 1.5 mil (about 0.038 mm), dissolves in water at a temperature of about 20° C. in less than 60 seconds.

The following test procedure, referred to herein as Mono-Sol Test Method 205 (MSTM 205), is used to determine the time required for a water-soluble film to break apart (disintegrate) and its subsequent relative dissolution time when held stationary. The test procedure is disclosed with reference to drawing FIGS. 1–3.

MonoSol Test Method 205 (MSTM 205)

Apparatus and Materials:

600 mL Beaker 12

Magnetic Stirrer 14 (Labline Model No. 1250 or equivalent)

Magnetic Stirring Rod 16 (5 cm)

Thermometer (0 to 100° C., ±1° C.)

Template, Stainless Steel (3.8 cm×3.2 cm)

Timer, (0–300 seconds, accurate to the nearest second)

Polaroid 35 mm Slide Mount 20 (or equivalent)

MonoSol 35 mm Slide Mount Holder 25 (or equivalent, see FIG. 1)

Distilled Water

Test Specimen:

1. Cut three test specimens from film sample using stainless steel template (i.e., 3.8 cm×3.2 cm specimen). If cut from a film web, specimens should be cut from areas of web evenly spaced along the transverse direction of the web.
2. Lock each specimen in a separate 35 mm slide mount 20.
3. Fill beaker 12 with 500 mL of distilled water. Measure water temperature with thermometer and, if necessary, heat or cool water to maintain temperature at 20° C. (about 68° F.).
4. Mark height of column of water. Place magnetic stirrer 14 on base 27 of holder 25. Place beaker 12 on magnetic stirrer 14, add magnetic stirring rod 16 to beaker 12, turn on stirrer 14, and adjust stir speed until a vortex develops which is approximately one-fifth the height of the water column. Mark depth of vortex.
5. Secure the 35 mm slide mount 20 in the alligator clamp 26 of the MonoSol 35 mm slide mount holder 25 (FIG. 1) such that the long end 21 of the slide mount 20 is parallel to the water surface, as illustrated in FIG. 2. The depth adjuster 28 of the holder 25 should be set so that when dropped, the end of the clamp 26 will be 0.6 cm below the surface of the water. One of the short sides 23 of the slide mount 20 should be next to the side of the beaker 12 with the other positioned directly over the center of the stirring rod 16 such that the film surface is perpendicular to the flow of the water, as illustrated in FIG. 3.
6. In one motion, drop the secured slide and clamp into the water and start the timer. Disintegration occurs when the film breaks apart. When all visible film is released from the slide mount, raise the slide out of the water while continuing to monitor the solution for undissolved film fragments. Dissolution occurs when all film fragments are no longer visible and the solution becomes clear.

Data Recording:

The results should include the following:

complete sample identification;

individual and average disintegration and dissolution times; and water temperature at which the samples were tested.

Standard quality control procedures may be followed for water-soluble PVOH film, with respect to bubble and pinhole inspection, however, such quality checks are not absolutely necessary given the solid state of the contained product. A unit dose of a non-liquid agent contained within the formed package does not necessarily pose the same packaging problems as a liquid product. With respect to the use of such a unit dose, however, no procedural changes are required. That is, merely adding the unit dose package to the appropriate quantity of water and following the necessary stirring or agitation times yields the desired cleaning, conditioning, or disinfectant solution.

While specific embodiments have been illustrated and described, numerous modifications are possible without departing from the spirit of the invention, and the scope of protection is only limited by the scope of the accompanying claims.

We claim:

1. A method for preparing a water-soluble copolymer film for packaging of a non-liquid product, the method comprising the steps of:

providing a vinyl acetate-methyl acrylate copolymer;

hydrolyzing the vinyl acetate-methyl acrylate copolymer to form a vinyl alcohol-gamma lactone copolymer having a 4% solution viscosity in the range of from about 5 to about 50 cps at 20° C.;

slurrying the hydrolyzed polymer with water;

adding modified starch to the copolymer-water slurry in an amount of from about 8.0 to about 25.0 percent by weight;

heating the vinyl alcohol-gamma lactone copolymer and starch to form a solution;

treating the solution with caustic soda to create a solution of a copolymer having from about 1 to about 12 mol percent carboxylate groups, from about 0 to about 11 mol percent gamma lactone units, and from about 88 to 99 mol percent vinyl alcohol units; and casting the hot copolymer solution on a suitable surface to create a film having a thickness in the range of from about 0.1 to about 5.0 mils (about 0.0025 to about 0.127 mm).

2. A method for preparing a water-soluble copolymer film for packaging of a non-liquid product, the method comprising the steps of:

copolymerizing vinyl acetate and methyl acrylate to form a copolymer;

hydrolyzing the vinyl acetate-methyl acrylate copolymer to form a vinyl alcohol-gamma lactone copolymer having a 4% solution viscosity in the range of from about 5 to about 50cps at 20° C.;

slurrying the hydrolyzed polymer with water;

adding modified starch to the copolymer-water slurry in an amount of from about 8.0 to about 25.0 percent by weight;

heating the hydrolyzed copolymer and starch slurry to form a solution;

treating the solution with caustic soda to create a solution of a copolymer having from about 1 to about 12 mol percent carboxylate groups, from about 0 to about 11 mol percent gamma lactone units, and from about 88 to about 99 mol percent vinyl alcohol units; and casting the hot copolymer solution on a suitable surface to create a film having a thickness in the range of from about 0.1 to about 5.0 mils (about 0.0025 to about 0.127 mm).

3. The method of claim 2, further comprising the step of adding sodium metabisulfite in an amount greater than 0.12 percent by weight to prevent browning of the heated solution.

4. The method of claim 3, wherein the amount of sodium metabisulfite is in the range of from about 0.4 to about 0.7 percent by weight.

5. The method of claim 2, wherein the copolymer solution comprises from about 2 to about 6 mol percent carboxylate groups, from about 0 to about 5 mol percent gamma lactone units, and from about 92 to about 98 mol percent vinyl alcohol units.

6. The method of claim 2, wherein the copolymer solution comprises from about 3 to about 4 mol percent carboxylate groups, from about 1 to about 2 mol percent gamma lactone units, and from about 94 to about 96 mol percent vinyl alcohol units.

7. The method of claim 2, wherein the amount of modified starch used is about 10 percent by weight.

8. The method of claim 7, wherein the modified starch comprises hydroxyethyl modified starch.

9. The method of claim 7, wherein the water-soluble film at a thickness of about 1.5 mil (about 0.038 mm) dissolves in water at a temperature of about 20° C. (about 68° F.) in less than 60 seconds in accordance with MonoSol test method MSTM 205.

10. The method of claim 2, further comprising the step of forming the resulting film into a package for packaging a non-liquid product.

11. The method of claim 2, wherein the water-soluble film at a thickness of about 1.5 mil (about 0.038 mm) dissolves in water at a temperature of about 20° C. (about 68° F.) in less than 60 seconds in accordance with MonoSol test method MSTM 205.

12. A water-soluble film fit packaging a non-liquid product, the film comprising:

a hydrolyzed copolymer of vinyl acetate and methyl acrylate in the range of from about 30 to about 95 percent by weight;

modified starch in the range of from about 5 to about 30 percent by weight;

plasticizer in the range of from about 5 to about 30 percent by weight;

lubricant/release agent in the range of from about 0.0 to about 1.5 percent by weight; and surfactant in the range of from about 0.01 to about 1.5 percent by weight.

13. The film composition of claim 12, wherein the modified starch comprises hydroxyethyl modified starch.

14. The film composition of claim 13, wherein the amount of modified starch is about 10 percent by weight.

15. The film composition of claim 12, wherein the water-soluble film, at a thickness of about 1.5 mil (about 0.038 mm), dissolves in less than 60 seconds in water at a temperature of about 20° C. (about 68° F.) in accordance with MonoSol Test Method MSTM-205.

16. The film composition of claim 12, wherein the hydrolyzed copolymer has a 4% solution viscosity in the range of about 5 to about 50 cps (about 0.005 to about 0.050 pascal seconds) at 20° C. (about 68° F.).

17. The film composition of claim 16, wherein the hydrolyzed copolymer has a 4% solution viscosity in the range of about 8 to about 35 cps (about 0.002 to about 0.035 pascal seconds) at 20° C. (about 68° F.).

18. The film composition of claim 17, wherein the hydrolyzed copolymer has a 4% solution viscosity in the range of about 15 to about 25 cps (about 0.015 to about 0.025 pascal seconds) at 20° C. (about 68° F.).

19. The film composition of claim 12, wherein the copolymer film thickness is in the range of from about 0.1 to about 5.0 mils (about 0.0025 to about 0.127 mm).

20. The film composition of claim 19, wherein the copolymer film thickness is in the range of from about 0.5 to about 3.0 mils (about 0.013 to about 0.076 mm).

21. The film composition of claim 20, wherein the copolymer film thickness is in the range of from about 1.0 to about 2.0 mils (about 0.025 to about 0.050 mm).

22. The film composition of claim 12, wherein the amount of plasticizer is in the range of from about 25 to about 30 percent by weight.

23. The film composition of claim 12, further comprising a suitable amount of an agent for controlling color drift in the film.

24. The film composition of claim 23, wherein the agent for controlling color drift is sodium metabisulfite.

25. The film composition of claim 24, wherein the amount of sodium metabisulfite is within the range of from about 0.12 to about 1.0 percent by weight.

26. The film composition of claim 25, wherein the amount of sodium metabisulfite as within the range or from about 0.4 to about 0.7 percent by weight.

27. The film composition of claim 12, wherein the hydrolyzed copolymer initially comprises an amount of from about 1 to about 12 mol percent gamma lactone units, and wherein after treatment with a caustic soda the hydrolyzed copolymer comprises from about 1 to about 12 mol percent carboxylate groups and from about 0 to about 11 mol percent gamma lactone units.

28. The film composition of claim 12, wherein the hydrolyzed copolymer initially comprises an amount of from about 2 to about 8 mol percent gamma lactone units, and wherein after treatment with a caustic soda the hydrolyzed copolymer comprises from about 2 to about 6 mol percent carboxylate groups and from about 0 to about 5 mol percent gamma lactone units.

29. The film composition of claim 12, wherein the hydrolyzed copolymer initially comprises an amount of from about 4 to about 6 mol percent gamma lactone units, and wherein after treatment with a caustic soda the hydrolyzed copolymer comprises film about 3 to about 4 mol percent carboxylate groups and from about 1 to about 2 mol percent gamma lactone units.

30. A package for containing a non-liquid product, the package comprising at least one compartment comprised of a water-soluble film according to claim 12.

31. The package of claim 30, wherein the modified starch comprises hydroxyethyl modified starch.

32. The package of claim 31, wherein the amount of modified starch is about 10 percent by weight.

33. The package of claim 30, wherein the water-soluble film, at a thickness of about 1.5 mil, (about 0.038 mm) dissolves in less than 60 seconds in water at a temperature of about 20° C. (about 68° F.) in accordance with MonoSol Test Method MSTM-205.

34. The package of claim 30, wherein the hydrolyzed copolymer has a 4% solution viscosity in the range of about 5 to about 50 cps (about 0.005 to about 0.050 pascal seconds) at 20° C.

35. The package of claim 34, wherein the hydrolyzed copolymer has a 4% solution viscosity in the range of about 8 to about 35 cps (about 0.008 to about 0.035 pascal seconds) at 20° C.

36. The package of claim 35, wherein the hydrolyzed copolymer has a 4% solution viscosity in the range of about 15 to about 25 cps (about 0.015 to about 0.025 pascal seconds) at 20° C.

37. The package of claim 30, wherein the copolymer film has a thickness in the range of from about 0.1 to about 5.0 mils (about 0.0025 to about 0.127 mm).

38. The package of claim 37, wherein the thickness is in the range of from about 0.5 to about 3.0 mils (about 0.013 to about 0.076 mm).

39. The package of claim 38, wherein the thickness is in the range of from about 1.0 to about 2.0 mils (about 0.025 to about 0.050 mm).

40. The package of claim 30, wherein the amount of plasticizer is in the range of from about 25 to about 30 percent by weight.

41. The package of claim 30, further comprising a suitable amount of an agent for controlling color drift in the film.

42. The package of claim 41, wherein the agent for controlling color drift is sodium metabisulfite.

43. The package of claim 42, wherein the amount of sodium metabisulfite is within the range of from about 0.12 to about 1.0 percent by weight.

44. The package of claim 43, wherein the amount of sodium metabisulfite is within the range of from about 0.4 to about 0.7 percent by weight.

45. The package of claim 30, wherein the hydrolyzed copolymer initially comprises an amount of from about 1 to about 12 mol percent gamma lactone units, and wherein after treatment with a caustic soda the hydrolyzed copolymer comprises from about 1 to about 12 mol percent carboxylate groups and from about 0 to about 11 mol percent gamma lactone units.

46. The package of claim 30, wherein the hydrolyzed copolymer initially comprises an amount of from about 2 to about 8 mol percent gamma lactone units, and wherein after treatment with a caustic soda the hydrolyzed copolymer comprises from about 2 to about 6 mol percent carboxylate groups and from about 0 to about 5 mol percent gamma lactone units.

47. The package of claim 30, wherein the hydrolyzed copolymer initially comprises an amount of from about 4 to about 6 mol percent gamma lactone units, and wherein after treatment with a caustic soda the hydrolyzed copolymer comprises from about 3 to about 4 mol percent carboxylate groups and from about 1 to about 2 mol percent gamma lactone units.

48. A unit dose of a non-liquid agent comprising:
   a package comprising a water-soluble film according to claim 12, and
   a non-liquid agent contained within the package.

49. The unit dose of claim 48, wherein the modified starch comprises hydroxyethyl modified starch.

50. The unit dose of claim 49, wherein the amount of modified starch is about 10 percent by weight.

51. The unit dose of claim 48, wherein the water-soluble film, at a thickness of about 1.5 mil, (about 0.038 mm) dissolves in less than 60 seconds in water at a temperature of about 20° C. (about 68° F.) in accordance with MonoSol Test Method MSTM-205.

52. The unit dose of claim 48, wherein the hydrolyzed copolymer has a 4% solution viscosity in the range of about 5 to about 50 cps (about 0.005 to about 0.050 pascal seconds) at 20° C.

53. The unit dose of claim 48, wherein the hydrolyzed copolymer has a 4% solution viscosity in the range of about 8 to about 35 cps (about 0.008 to about 0.035 pascal seconds) at 20° C. (about 68° F.).

54. The unit dose of claim 48, wherein the hydrolyzed copolymer has a 4% solution viscosity in the range of about 15 to about 25 cps (about 0.015 to about 0.025 pascal seconds) at 20° C. (about 68° F.).

55. The unit dose of claim 48, wherein the copolymer film thickness is in the lunge of from about 0.1 to about 5.0 mils (about 0.0025 to about 0.127 mm).

56. The unit dose of claim 55, wherein the copolymer film thickness is in the range of from about 0.5 to about 3.0 mils (about 0.013 to about 0.076 mm).

57. The unit dose of claim 56, wherein the copolymer film thickness is in the range of from about 1.0 to about 2.0 mils (about 0.025 to about 0.050 mm).

58. The unit dose of claim 48, wherein the amount of plasticizer is in the range of from about 25 to about 30 percent by weight.

59. The unit dose of claim 48, further comprising a suitable amount of an agent for controlling color drift in the film.

60. The unit dose of claim 59, wherein the agent for controlling color drift is sodium metabisulfite.

61. The unit dose of claim 60, wherein the amount of sodium metabisulfite is within the range of from about 0.12 to about 1.0 percent by weight.

62. The unit dose of claim 60, wherein the amount of sodium metabisulfite is within the range of from about 0.4 to about 0.7 percent by weight.

63. The unit dose of claim 48, wherein the hydrolyzed copolymer initially comprises an amount of from about 1 to about 12 mol percent gamma lactone units, and wherein after treatment with a caustic soda the hydrolyzed copolymer comprises from about 1 to about 12 mol percent carboxylate groups and from about 0 to about 11 mol percent gamma lactone units.

64. The unit dose of claim 48, wherein the hydrolyzed copolymer initially comprises an amount of from about 2 to about 8 mol percent gamma lactone units, and wherein after treatment with a caustic soda the hydrolyzed copolymer comprises from about 2 to about 6 mol percent carboxylate groups and from about 0 to about 5 mol percent gamma lactose units.

65. The unit dose of claim 48, wherein the hydrolyzed copolymer initially comprises an amount of from about 4 to about 6 mol percent gamma lactone units, and wherein after treatment with a caustic soda the hydrolyzed copolymer comprises from about 3 to about 4 mol percent carboxylate groups and from about 1 to about 2 mol percent gamma lactone units.

* * * * *

UNITED STATES PATENT AND TRADEMARK OFFICE
CERTIFICATE OF CORRECTION

PATENT NO.    : 6,821,590 B2
DATED         : November 23, 2004
INVENTOR(S)   : Verrall et al.

It is certified that error appears in the above-identified patent and that said Letters Patent is hereby corrected as shown below:

<u>Title page, Item [54] and Column 1, lines 1-2,</u>
Title, delete "STARCH-LOADED POLYVINYL ALCOHOL COPOLYMER FILM" and insert -- STARCH-LOADED POLYVINYL ALCOHOL COPOLYMER FILM FOR PACKAGING NON-LIQUID PRODUCT AND METHOD FOR MAKING THE SAME --.

<u>Column 7,</u>
Line 63, delete "50cps" and insert -- 50 cps --.

<u>Column 8,</u>
Line 46, delete "fit" and insert -- for --.

<u>Column 9,</u>
Line 7, delete "0.002" and insert -- 0.008 --.
Line 33, delete "as" and insert -- is --.

<u>Column 11,</u>
Line 14, delete "lunge" and insert -- range --.

Signed and Sealed this

Sixteenth Day of August, 2005

JON W. DUDAS
*Director of the United States Patent and Trademark Office*